UNITED STATES PATENT OFFICE.

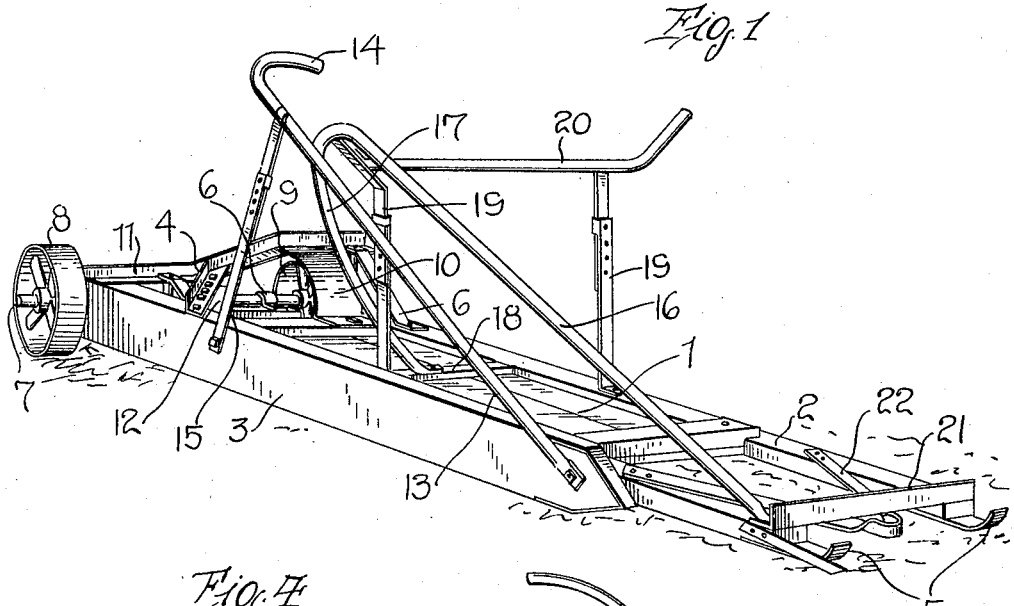
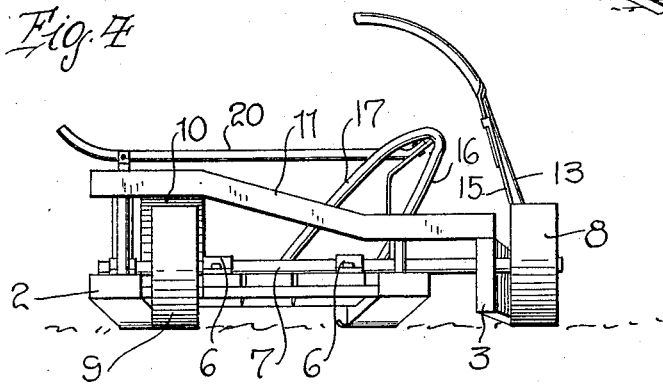
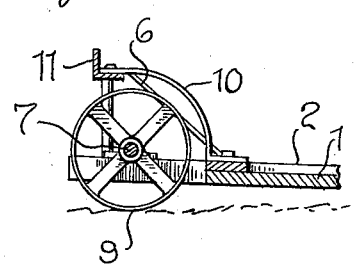
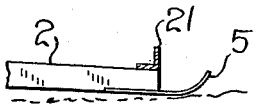

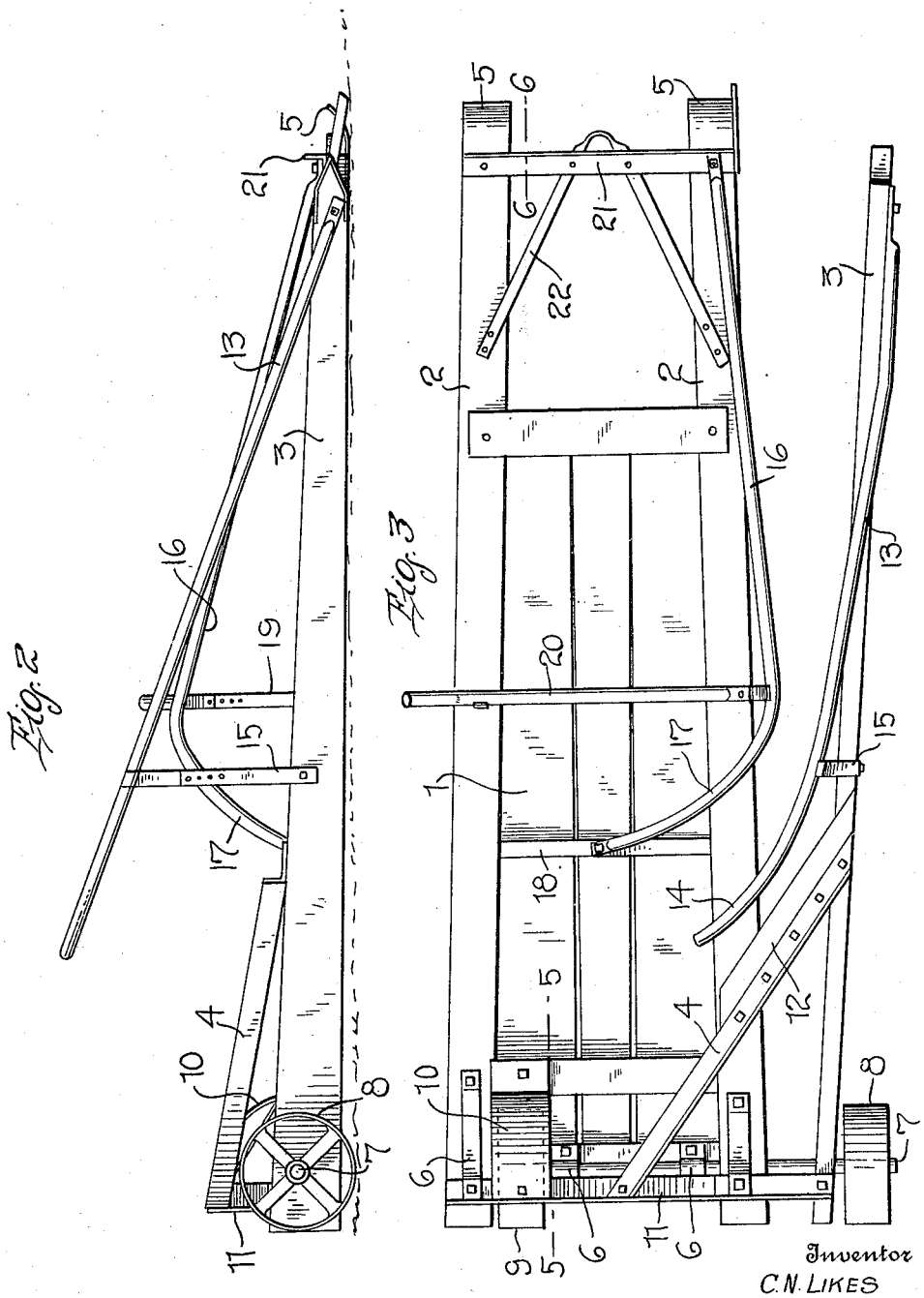

CLYDE N. LIKES, OF KENDALLVILLE, INDIANA, ASSIGNOR OF ONE-HALF TO OTTO E. LIKES, OF KENDALLVILLE, INDIANA.

CORN-CUTTER.

1,110,502.  Specification of Letters Patent.  Patented Sept. 15, 1914.

Application filed August 16, 1913. Serial No. 785,182.

*To all whom it may concern:*

Be it known that I, CLYDE N. LIKES, a citizen of the United States, residing at Kendallville, in the county of Noble and State of Indiana, have invented certain new and useful Improvements in Corn-Cutters, of which the following is a specification, reference being had to the accompanying drawings.
This invention relates to new and useful improvements in corn harvesters and more particularly to a corn cutter and the primary object of the invention is to provide a device of this character which may be drawn through a corn field to quickly and readily sever the stalks and collect the same on the device, whereby said stalks may be carried from the field in bulk.

A further object of the invention resides in providing a device in which the guiding arms thereof are designed to bend the stalks loosely in one direction and then laterally in the opposite direction prior to the cutting thereof so that the same may be severed readily and dropped in position on the cradle and platform with a snappy and jerky action.

A still further object of the invention resides in providing a device which is simple and durable in construction, inexpensive to manufacture and one which will be very efficient and useful in operation.

With these and other objects in view, the invention consists in the novel features of construction, combination and arrangement of parts as will be hereinafter referred to and more particularly pointed out in the specification and claims.

In the accompanying drawings forming a part of this application, Figure 1 is a perspective view of the device. Fig. 2 is a side elevation of the same. Fig. 3 is a plan view thereof. Fig. 4 is a rear elevation of the same. Fig. 5 is a section as seen on line 5—5, Fig. 3; and Fig. 6 is a similar view as seen on line 6—6, Fig. 3.

In describing my invention, I shall refer to the drawings in which similar reference characters designate corresponding parts throughout the several views and in which 1 indicates a platform mounted on the runners 2 and supported on the platform in spaced relation to one of the side runners thereof, is an additional runner 3. This runner 3 is arranged angular to the vertical plane of the side runner adjacent which the same is disposed, whereby to form a mouth or throat-like portion between the adjacent side runner and the same and said runner is braced in position with respect to the platform by means of a bracing arm 4 which is formed of angle iron secured to the rear portion of the platform and to said runner intermediate of its ends. The runners 2 and 3 are sharpened and otherwise properly designed, as shown at 5, to form lifters for the device.

Rigidly secured by means of the straps 6 on the rear portion of the platform 1, is a transversely extending shaft 7, the one end of which projects beyond the platform and is suitably secured to the rear end of the runner 3. This shaft, of course, also forms a bracing means for the runner and the last mentioned end of said shaft also projects beyond said runner 3 and has a small ground wheel 8 thereon. This wheel rotates freely on the shaft and also rotatably mounted on the shaft adjacent the opposite side runner, is an additional ground wheel 9. A shield or guard 10 is mounted on the rear portion of the platform to cover this last mentioned wheel 9 and a strap iron 11, which extends transversely of the platform is secured to said shield. It must here be stated also that the bracing arm 4 is secured to this strap iron 11 and inasmuch as said strap iron is inclined upwardly toward one end of the platform, it will be seen that the bracing arm 4 will also be directed upwardly. This bracing arm 4, it will be observed, extends across the space forming the mouth or throat portion between the runner 3 and the adjacent side runner 2 of the platform and secured to this bracing arm at the point wherein the same projects across the mouth or throat portion, is a blade 12.

Secured to the side of the runner 3, at its forward end, is a rod or arm 13, which is inclined upwardly toward the rear portion of the device and has the free end thereof bent or curved inwardly, as shown at 14. This rod or arm 13 is braced to the runner 3 by means of a vertically adjustable supporting arm 15. Secured to the forward end of the runner on the platform, adjacent the runner 3, is an additional rod or arm 16 which is inclined upwardly and outwardly to a point adjacent the point of curvature in the rod or arm 13 and is then bent inwardly and downwardly, as shown at 17 to be secured to a transverse bar 18 in approximately the central portion of the platform 1. A pair of vertically adjustable arms 19 are secured to the upper faces of the sills or runners of the platform and are connected by a transverse rod or bar 20. The one end of said rod or bar is engaged with the rod or arm 16 at the point wherein the same is bent downwardly and inwardly.

The forward portions of said runners 2 are braced by means of an arm 21 and secured to said runners rearward of the arm 21, are the ends of a V-shaped strap 22. The vertex of the V-shaped member extends forward of and below the arm 21 and forms a means for securing draft securing devices thereto.

In practice, this device is driven through the fields with any desired form of power applied thereto, so that one runner will be disposed on one side of a row of corn and the runner 3 on the opposite side of the row. The mouth or throat portion hereabove mentioned will, therefore, receive the stalks as the device is propelled and as the stalks first come in contact with the guide arm or rod 16, the same will be bent laterally in one direction and when said stalks reach the point of bending of said rod or arm 16, the same will contact with the guide arm 13 to be directed laterally in the opposite direction. Continuing on, the stalks will be bent around the curved portion 14 of said guide arm 13 and as the propulsion of the device is continued, the stalks will be bent forwardly. At this time, the knife blade 12 will contact with the stalks to sever the same quickly and snappily from their roots. As the stalks are cut, the same will be directed downwardly against the downwardly and inwardly inclined portion 19 and fall upon the cradle and platform of the device.

It will be understood that while I have shown the parts of the device constructed of wood, they may be formed of angle iron or other suitable material and connected together in such manner as to form a smooth upper surface for the platform.

While I have shown the preferred form of my device, it will be understood that minor changes in the details of construction and arrangements of parts may be made within the scope of the appended claims without departing from the spirit of my invention or sacrificing any of the advantages of the same.

Having thus described this invention, what is claimed is:—

1. A device of the class described comprising a platform, a trio of runners mounted thereon, one of said runners being arranged angularly with respect to another of said runners to provide a throat portion on one side of the former, a cutter arranged across the rear end of said throat portion, a pair of upwardly inclined and rearwardly converging guide arms mounted on the runners forming said throat portion, the rear ends of said guide arms being bent inwardly to form a bending contrivance for the device and means for vertically adjusting said guide arms with respect to the platform.

2. A device of the class described comprising a platform, a trio of runners mounted thereon, a pair of said runners being arranged parallel and the other of said runners being disposed angularly with respect to one of the aforesaid runners to provide a throat portion on one side of the device, a cutter arranged across the rear end of said throat portion, an arm pivotally secured at its forward end to the outer side of the last mentioned runner, forming the portion of the throat, said arm being disposed rearwardly and upwardly and having its extreme rear end curved inwardly, an adjustable supporting arm engaged with the last mentioned runner and said arm, an additional arm pivotally secured to the other runner of the throat portion and inclined upwardly and rearwardly, the free end of said last mentioned arm being bent inwardly and downwardly and adjustably secured to the platform, a pair of vertically adjustable supporting arms secured on the upper faces of the aforesaid pair of parallel runners, one of said adjustable arms being connected to the last mentioned upwardly and rearwardly inclined arm, and a transverse bar connected to the upper portions of said adjustable arms.

3. A device of the class described comprising a platform, a trio of runners mounted thereon, a pair of said runners being arranged substantially parallel and the other of said runners being disposed angularly with respect to one of the aforesaid runners to form a throat portion on the device, an axle mounted on the rear end portion of the platform and projecting beyond the last mentioned runner, a pair of supporting wheels carried on said axle, one of said wheels being disposed beyond the last mentioned runner and the other of said wheels being disposed in a space between the first mentioned pair of runners, a strap formed of angle iron secured to the rear end of the last mentioned runner of the trio of runners, said strap being distorted angularly to project over the last mentioned supporting wheel and supporting the last mentioned end on the outer runner of the pair of runners, a fender for said last mentioned supporting wheel secured to said platform and to the strap forward of the wheel, an additional strap secured to the aforesaid strap intermediate of its ends and also secured to the last mentioned runner of the trio of runners intermediate of the latter, said strap being angular in cross section and extending diagonally across the rear end of the throat portion of the device, a knife blade secured to the last mentioned strap, and a pair of directing and bending arms secured to the runners forming the throat portion of the device.

In testimony whereof I hereunto affix my signature in the presence of two witnesses.

CLYDE N. LIKES.

Witnesses:
J. AUSTIN JONES,
ALBERT G. COYNER.

Copies of this patent may be obtained for five cents each, by addressing the "Commissioner of Patents, Washington, D. C."